Sept. 24, 1968 A. C. WOOLDRIDGE 3,403,351
WIDEBAND AMPLIFIER INPUT CIRCUIT
Filed April 5, 1965
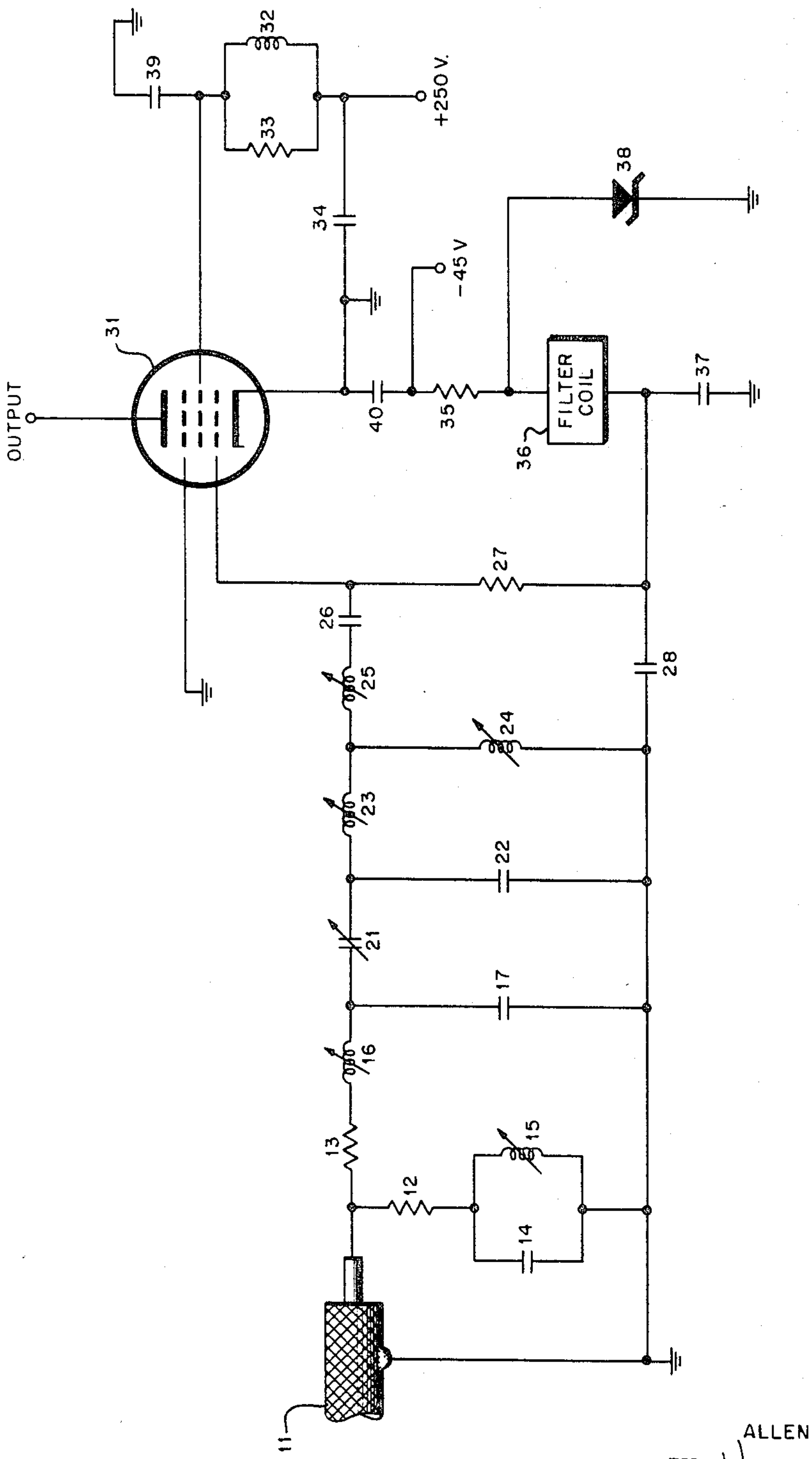
INVENTOR
ALLEN C. WOOLDRIDGE
BY Henry Hansen
William C. Everett
ATTORNEYS Patented Sept. 24, 1968

3,403,351

WIDEBAND AMPLIFIER INPUT CIRCUIT

Allen C. Wooldridge, Bernardsville, N.J., assignor, by mesne assignments, to the United States of America as represented by the Secretary of the Navy
Filed Apr. 5, 1965, Ser. No. 446,484
7 Claims. (Cl. 330—185)

ABSTRACT OF THE DISCLOSURE

A wideband amplifier input circuit with a constant resistance single resonant input line coupled with a double tuned line having resonant frequencies on either side of the resonant frequency of the constant resistance single resonant line for maintaining a constant input voltage over a wide range of frequencies.

The present invention relates to amplifier input circuits and more particularly to a wideband amplifier input circuit which has both constant input resistance and constant grid voltage over a wide band of frequencies.

In the field of amplifier input circuits it is known to have an input circuit to the grid of an amplifying tube, such as a pentode, which presents to the preceding section of the amplifier circuit a constant input resistance. Such constant resistance is necessary for impedance matching. Such a constant resistant input circuit is shown, for example, in the TV Engineer's Handbook, Donald G. Fink, editor, 1957 on page 12–9. All such constant resistance input circuits to date have had a disadvantage in that the voltage presented to the grid for a given input signal varied with frequency. This is so because the voltage coupling into the grid is the voltage across the capacitor of a loaded series resonant circuit and this cannot be constant versus frequency.

The general purpose of this invention is to provide a wideband amplifier input circuit which retains the feature of the prior circuits of constant input resistance over a wide band of frequencies and, in addition, presents to the grid of the amplifying tube a constant voltage over the same wide band of frequencies. To attain this the present invention provides a constant resistance single resonant input line with an added series resistance linked to a double tuned line having two resonant frequencies, one on each side of the resonant frequency of the constant resistance line, and a shunt resistance connected across the double tuned line, with the output signal of the input circuit being taken across the shunt resistance. This produces a new constant resistance input circuit with the voltage gain across the shunt resistance being constant over the entire bandwidth of the circuit.

Accordingly, it is an object of the present invention to provide a constant resistance wideband amplifier input circuit.

Another object of the invention is to provide a wideband amplifier input circuit with a constant voltage gain on the grid over the bandwidth of the circuit.

Other objects and many of the attendant advantages of this invention will be readily appreciated as the same becomes better understood by reference to the following detailed description when considered in connection with the accompanying drawings and wherein the figure shows a circuit diagram of a pentode amplifying tube with the wideband amplifier input circuit of the present invention.

In the figure there is shown a coaxial cable input 11 with its outer sheath connected to ground. The center line of the cable 11 is connected to the common point of two resistances 12 and 13. The other end of resistance 12 is connected to a parallel LC circuit, composed of capacitance 14 and variable inductance 15, which is connected to ground. The other end of resistance 13 is connected to a variable inductance 16 which is connected through a capacitance 17 to ground.

Across capacitance 17 there is connected a variable capacitance 21 linked to ground through a capacitance 22. Linked to the comman point of capacitances 21 and 22 is a variable inductance 23 which is also linked to ground through a variable inductance 24. Linked to the common point of variable inductances 23 and 24 is a variable inductance 25 and a capacitance 26. Capacitance 26 is linked to a resistance 27 which is linked to ground through a capacitance 28 and to a bias supply.

Resistance 27 is connected to the grid of a pentode 31. Attached to the screen grid of pentode 31 is a filter coil consisting of an inductance 32 and a resistance 33 leading to a 250 volt supply. The 250 volt supply is coupled through a capacitance 34 to ground. A —45 volt bias supply for the grid of pentode 31 is coupled through a resistance 35 and a filter coil 36 to resistance 27. Resistance 27 is also coupled through a capacitance 37 to ground. Resistance 35 also connects the bias supply through a Zener diode 38 to ground. Capacitance 39 connects the screen grid of pentode 31 to ground. Capacitance 40 provides stability for the —45 volt supply. The output of pentode 31 is linked to an output circuit and power supply (not shown).

The operation of the amplifier input circuit is as follows. Resistances 12 and 13, capacitances 14 and 17, and variable inductances 15 and 16 comprise a known constant resistance input circuit similar to that shown in the TV Engineer's Handbook by D. G. Fink, except that resistance 13, instead of being the same in value as resistance 12 as in the constant resistance circuit, is greater by an amount calculated to add an extra series load in the input circuit. This constant resistance circuit is single resonant in that the ratio of grid voltage to input voltage rises to a peak at a resonant frequency and is more or less flat from there to a certain range on each side of that frequency. Capacitances 21, 22 and 26 and inductances 23, 24 and 25 are part of a double tuned line having two resonant peaks of output voltage compared to input voltage. The values of the inductances and capacitances are chosen to make the resonant peaks of the double tuned line symmetrical with respect to the gain peak of the constant resistance input line comprising elements 12 through 17. The output of the double tuned line is measured across resistance 27 which provides a shunt resistance. The effect of the combination of the double tuned line with the constant resistance input circuit is to provide an essentially triple tuned input circuit. In addition, the effect of the additional series load in resistance 13 and the shunt resistance 27 is to flatten out the curve to produce at the grid of pentode 31 a substantially constant voltage over the wide band of the input circuit with respect to the input voltage on coaxial cable 11. In addition, the input resistance as measured at coaxial cable 11 is constant throughout the wide band.

The values of impedances 14, 15, 16 and 17 are selected, as with the constant resistance circuit shown by Fink, according to the formula:

$$LC=L'C'$$

where L is the inductance 16, C is the capacitance 17, L′ is the inductance 15, and C′ is the capacitance 14.

The rated value of Zener diode 38 determines the bias on the grid of pentode 31. Filter coil 36 and capacitance 37 will prevent any fluctuations from the —45 volt supply from appearing at the grid 31.

Obviously many modifications and variations of the present invention are possible in the light of the above teachings. It is therefore to be understood that within the scope of the appended claims the invention may be practiced otherwise than as specifically described.

What is claimed is:

1. A wideband amplifier input circuit comprising:
- a constant resistance single resonant input line;
- a double tuned line connected to said single resonant line and having two resonant frequencies, one on each side of the resonant frequency of said single resonant line; and
- a shunt resistance connected across the output of said double tuned line, the output signal of said input circuit being taken across the shunt resistance.

2. A wideband amplifier input circuit as recited in claim 1 wherein the constant resistance circuit comprises:
- a first resistance;
- a first inductance connected at its respective ends to one end of said first resistance and to ground;
- a first capacitance in parallel with said first inductance;
- a second resistance connected at one end thereof to the other end of said first resistance, the ohmic value of said second resistance being greater than that of said first resistance;
- a second inductance connected at one end thereof to the other end of said second resistance;
- a second capacitance connected at one end thereof to the other end of said second inductance and to ground, whereby the output of said constant resistance circuit is taken across said second capacitance.

3. A wideband amplifier input circuit as recited in claim 2 wherein the product of said first inductance and capacitance is equal to the product of said second inductance and capacitance.

4. A wideband amplifier input circuit as recited in claim 1 wherein said double tuned line comprises:
- a third capacitance connected to an output terminal of said constant resistance circuit;
- a fourth capacitance connected between ground and said third capacitance;
- a third inductance connected at one end thereof to the common junction of said third capacitance and said fourth capacitance;
- a fourth inductance connected at one end thereof to the other end of said third inductance, the other end of said fourth inductance being connected to ground;
- a fifth inductance connected at one end thereof to the common junction of said third inductance and said fourth inductance;
- a fifth capacitance connected at one end thereof to the other end of said fifth inductance, the other end of said capacitance being connected to said shunt resistance; and
- a sixth capacitance connected between the other end of said shunt resistance and ground, whereby the output signal of said wideband amplifier circuit is taken across said shunt resistance.

5. A wideband amplifier input circuit as recited in claim 2 wherein said double tuned line comprises:
- a third capacitance connected to an output terminal of said constant resistance circuit;
- a fourth capacitance connected between ground and said third capacitance;
- a third inductance connected at one end thereof to the common junction of said third capacitance and said fourth capacitance;
- a fourth inductance connected at one end thereof to the other end of said third inductance, the other end of of said fourth inductance being connected to ground;
- a fifth inductance connected at one end thereof to the common junction of said third inductance and said fourth inductance;
- a fifth capacitance connected at one end thereof to the other end of said fifth inductance, the other end of said capacitance being connected to said shunt resistance; and
- a sixth capacitance connected between the other end of said shunt resistance and ground, whereby the output signal of said wideband amplifier circuit is taken across said shunt resistance.

6. A wideband amplifier input circuit as recited in claim 5 wherein the product of said first inductance and capacitance is equal to the product of said second inductance and capacitance.

7. A wideband amplifier input circuit comprising:
- a constant resistance single resonant input line including a first resistance, a first inductance connected at its respective ends to one end of said resistance and to ground, a first capacitance in parallel with said first inductance, a second resistance connected at one end thereof to the other end of said first resistance, the ohmic value of said second resistance being greater than that of said first resistance, a second inductance connected at one end thereof to the other end of said second resistance, a second capacitance connected at one end thereof to the other end of said second inductance and to ground, whereby the output of said constant resistance circuit is taken across said second capacitance;
- a double tuned line connected to said single resonant line and having two resonant frequencies, one on each side of the resonant frequency of said single resonant line; and
- a shunt resistance connected across the output of said double tuned line, the output signal of said input circuit being taken across the shunt resistance.

References Cited

UNITED STATES PATENTS

| | | | |
|---|---|---|---|
| 2,274,347 | 2/1942 | Rust et al. | 333—27 |
| 3,222,623 | 12/1965 | Geikler et al. | 333—33 XR |

ROY LAKE, *Primary Examiner.*

NATHAN KAUFMAN, *Assistant Examiner.*